(12) United States Patent
Kasahara

(10) Patent No.: US 11,052,903 B2
(45) Date of Patent: *Jul. 6, 2021

(54) HYBRID VEHICLE DRIVE SYSTEM

(71) Applicant: Honda Motor Co., Ltd., Tokyo (JP)

(72) Inventor: Takahiro Kasahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 335 days.

This patent is subject to a terminal disclaimer.

(21) Appl. No.: 16/285,171

(22) Filed: Feb. 25, 2019

(65) Prior Publication Data

US 2019/0276006 A1    Sep. 12, 2019

(30) Foreign Application Priority Data

Mar. 9, 2018   (JP) .............................. JP2018-042586

(51) Int. Cl.
| | |
|---|---|
| *B60W 20/30* | (2016.01) |
| *B60W 10/08* | (2006.01) |
| *B60W 10/115* | (2012.01) |
| *B60W 20/20* | (2016.01) |
| *F16H 3/72* | (2006.01) |
| *B60K 6/442* | (2007.10) |
| *B60K 6/365* | (2007.10) |

(52) U.S. Cl.
CPC ............. *B60W 20/30* (2013.01); *B60K 6/365* (2013.01); *B60K 6/442* (2013.01); *B60W 10/08* (2013.01); *B60W 10/115* (2013.01); *B60W 20/20* (2013.01); *F16H 3/724* (2013.01); *B60W 2510/1005* (2013.01); *B60W 2710/083* (2013.01); *B60W 2710/1005* (2013.01); *B60Y 2200/92* (2013.01)

(58) Field of Classification Search
None
See application file for complete search history.

(56) References Cited

U.S. PATENT DOCUMENTS

| | | | | |
|---|---|---|---|---|
| 7,108,087 | B2 * | 9/2006 | Imai ...................... | B60W 10/02 180/65.23 |
| 8,172,018 | B2 * | 5/2012 | Suzuki .................. | B60W 10/08 180/65.285 |

(Continued)

FOREIGN PATENT DOCUMENTS

JP           2012240551 A        12/2012

*Primary Examiner* — Dirk Wright
(74) *Attorney, Agent, or Firm* — Duft & Bornsen, PC

(57) ABSTRACT

A drive system of a hybrid vehicle including an internal combustion engine, a first motor-generator, a power division mechanism, a speed change mechanism including a second output shaft, a second motor-generator including a third output shaft connected to a power transmission path transmitting a power from the second output shaft to an axle, a one-way clutch interposed between the second output shaft and the third output shaft in the power transmission path, and an electric control unit including a microprocessor to control the speed change mechanism. The speed change mechanism includes a first engagement mechanism and second engagement mechanism, and the microprocessor is configured to control the speed change mechanism so as to disengage one of the first engagement mechanism and the second engagement mechanism in engaged state and engage the other thereof in disengaged state, in accordance with a speed change instruction.

8 Claims, 13 Drawing Sheets

(56) References Cited

U.S. PATENT DOCUMENTS

| | | | |
|---|---|---|---|
| 9,340,198 B2* | 5/2016 | Ito | B60W 20/13 |
| 10,604,145 B2* | 3/2020 | Kasahara | B60K 6/445 |
| 10,696,150 B2* | 6/2020 | Kasahara | H02K 7/083 |
| 10,710,447 B2* | 7/2020 | Kasahara | B60W 10/06 |
| 10,870,424 B2* | 12/2020 | Kasahara | B60K 6/445 |
| 2019/0291565 A1* | 9/2019 | Kasahara | B60W 10/06 |
| 2019/0291716 A1* | 9/2019 | Kasahara | B60W 50/082 |
| 2019/0291717 A1* | 9/2019 | Kasahara | B60W 20/10 |
| 2019/0308628 A1* | 10/2019 | Kasahara | B60W 10/115 |
| 2019/0344652 A1* | 11/2019 | Kasahara | H02K 7/1815 |
| 2019/0351894 A1* | 11/2019 | Nakagawara | B60W 10/02 |
| 2020/0369142 A1* | 11/2020 | Kasahara | B60K 6/445 |
| 2021/0024053 A1* | 1/2021 | Kasahara | B60W 20/20 |

\* cited by examiner

|  | BR | CL | OWY | ENG |
|---|---|---|---|---|
| EV MODE | × | × | × | × |
| W MOTOR MODE | × | ○ | ○ | × |
| SERIES MODE | ○ | ○ | × | ○ |
| HV MODE LOW | × | ○ | ○ | ○ |
| HV MODE HIGH | ○ | × | ○ | ○ |

EV MODE

W MOTOR MODE

SERIES MODE

HV LOW MODE

HV HIGH MODE

HV HIGH MODE

HV LOW MODE

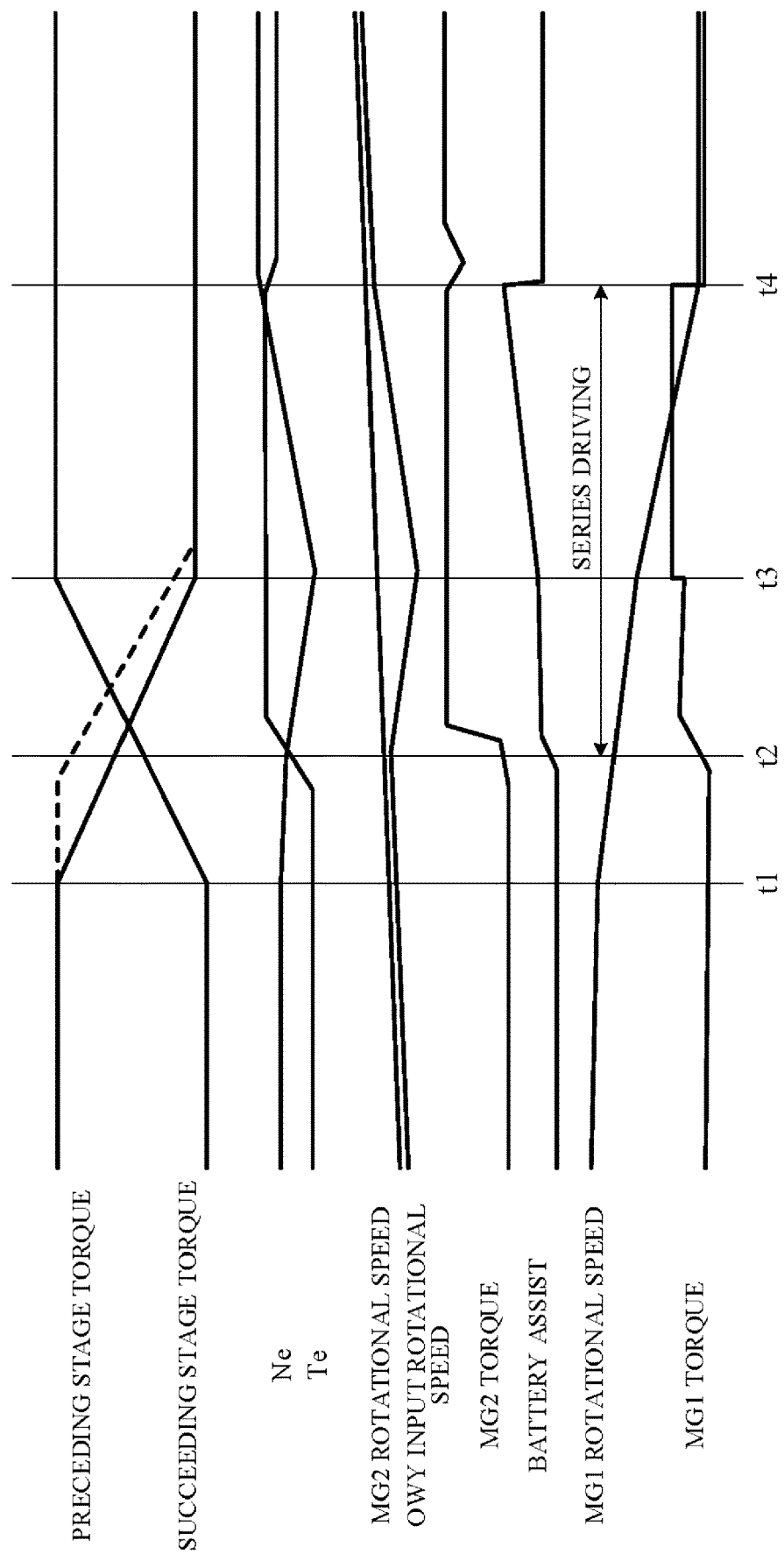

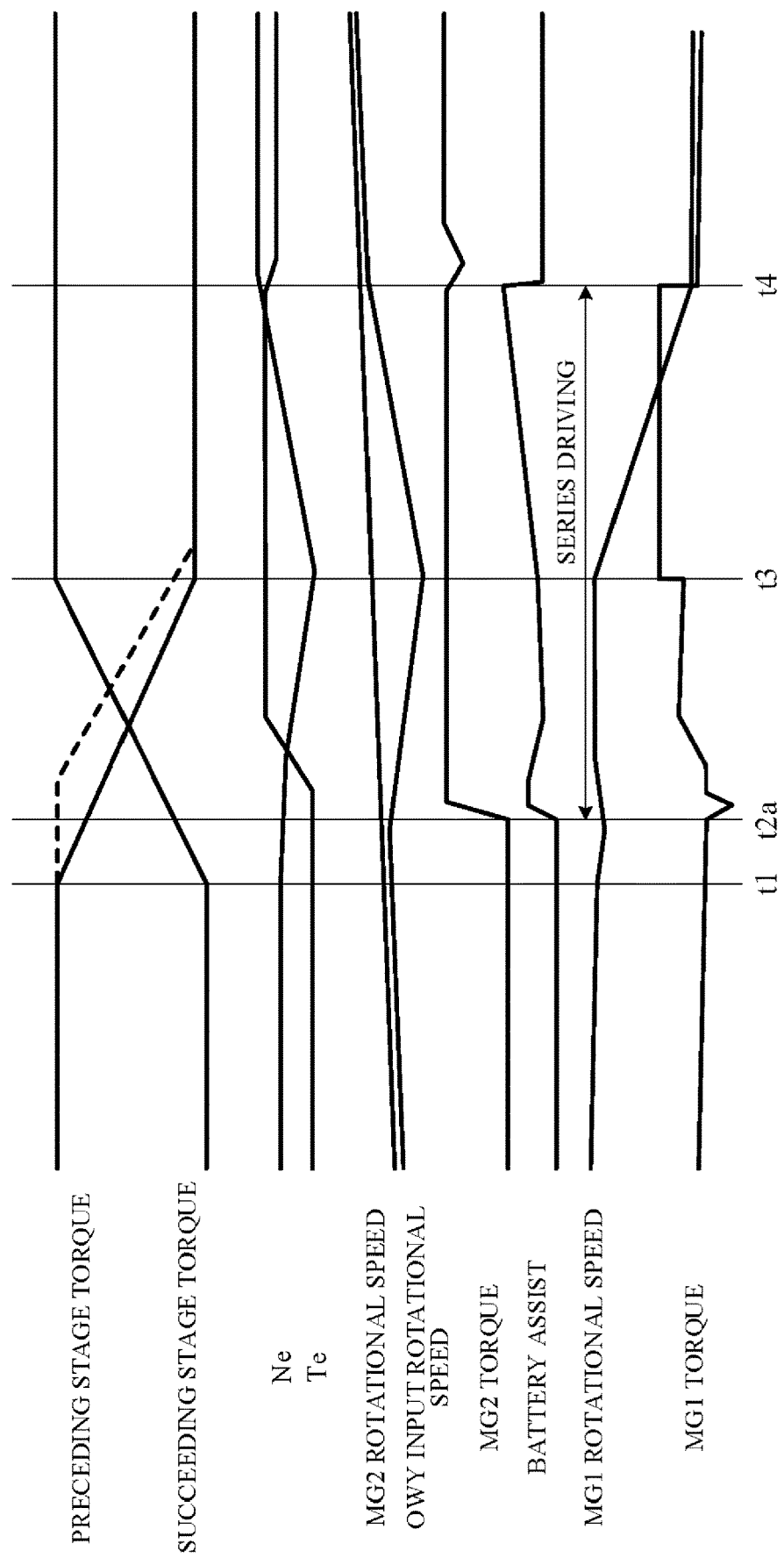

HYBRID VEHICLE DRIVE SYSTEM

CROSS-REFERENCE TO RELATED APPLICATION

This application is based upon and claims the benefit of priority from Japanese Patent Application No. 2018-042586 filed on Mar. 9, 2018, the content of which is incorporated herein by reference.

BACKGROUND OF THE INVENTION

Field of the Invention

This invention relates to a drive system of a hybrid vehicle including a speed change mechanism.

Description of the Related Art

Conventionally, there is a known apparatus of this type that includes a power distribution mechanism for distributing power of an engine serving as main power source to a first electric motor and a transmission member, a second electric motor connected to the transmission member, and a speed change mechanism provided between the transmission member and drive wheels. Such an apparatus is described in, for example, Japanese Unexamined Patent Publication No. 2012-240551 (JP2012-240551A). In the apparatus described in JP2012-240551A, the speed change mechanism includes a pair of friction engagement mechanisms, and is switched to a high-speed range or a low-speed range by engaging one friction engagement mechanism and disengaging the other friction engagement mechanism or by disengaging the one friction engagement mechanism and engaging the other friction engagement mechanism.

When the speed change mechanism of the drive apparatus of JP2012-240551A is shifted from high-speed range to low-speed range, for example, clutch torque of the one friction engagement mechanism in engaged state is reduced to and held waiting at a predetermined value and thereafter gradually reduced toward 0. In addition, clutch torque of the other friction engagement mechanism in disengaged state is increased in step with this gradual reduction toward 0. Therefore, since prompt switching of the speed change mechanism is difficult, the drive apparatus has a disadvantage of poor shift responsiveness.

SUMMARY OF THE INVENTION

An aspect of the present invention is a drive system of a hybrid vehicle, includes: an internal combustion engine including a first output shaft; a first motor-generator; a rotor; a power division mechanism connected to the internal combustion engine to divide a power generated by the internal combustion engine to the first motor-generator and the rotor; a speed change mechanism including a second output shaft and configured to change a rotational speed of the rotor; a path forming portion configured to form a power transmission path transmitting a power from the second output shaft to an axle; a second motor-generator including a third output shaft connected to the power transmission path; a one-way clutch interposed between the second output shaft and the third output shaft in the power transmission path to allow a relative rotation of the third output shaft with respect to the second output shaft in one direction and prohibit the relative rotation of the third output shaft in an opposite direction; and an electric control unit including a microprocessor and a memory and configured to control the speed change mechanism. The speed change mechanism includes a first engagement mechanism including mutually engageable and disengageable members and a second engagement mechanism including mutually engageable and disengageable members. The microprocessor is configured to control the speed change mechanism so as to disengage one of the first engagement mechanism and the second engagement mechanism in an engaged state and engage the other of the first engagement mechanism and the second engagement mechanism in a disengaged state, in accordance with a speed change instruction.

BRIEF DESCRIPTION OF THE DRAWINGS

The objects, features, and advantages of the present invention will become clearer from the following description of embodiments in relation to the attached drawings, in which:

FIG. 13A is a timing chart showing an example of an action of the drive system according to the embodiment of the invention; and FIG. 13B is a timing chart showing a modification of FIG. 13A.

DETAILED DESCRIPTION OF THE INVENTION

Figure 1:
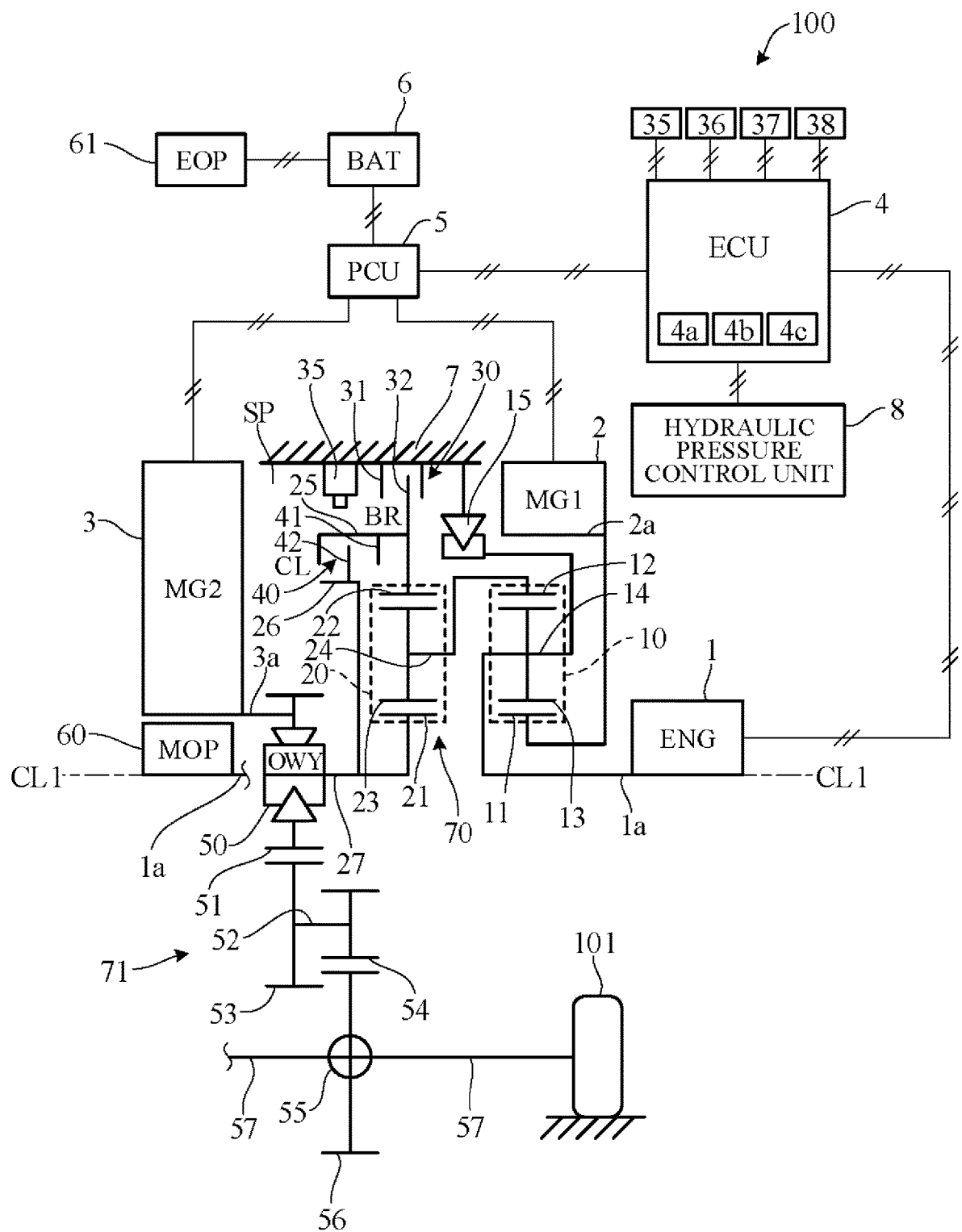
FIG. 1 is a diagram showing schematically a configuration overview of a drive system of a hybrid vehicle according to an embodiment of the invention.

Hereinafter, an embodiment of the present invention is explained with reference to FIGS. 1 to 13B. A drive system according to an embodiment of the present invention is applied to a hybrid vehicle including an engine and a motor-generator as a drive power source. FIG. 1 is a diagram showing schematically a configuration overview of a drive system 100 according to the present embodiment.

As shown in FIG. 1, the drive system (drive unit) 100 includes an engine (ENG) 1, first and second motor-generators (MG1 and MG2) 2 and 3, a first planetary gear mechanism 10 for dividing motive power, and a second planetary gear mechanism 20 for changing speed ratio. The drive system 100 is mounted at front of a vehicle, and motive power of the drive system 100 is transmitted to front wheels 101. The vehicle is thus structured as a front-wheel-drive (i.e., FF layout) vehicle.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Throttle valve opening, quantity of fuel injected from the injector (injection time and injection time period) and ignition time are, inter alia, controlled by a controller 4. An output shaft 1a of the engine 1 extends centered on axis CL1.

The first and second motor-generators 2 and 3 each has a substantially cylindrical rotor centered on axis CL1 and a substantially cylindrical stator installed around the rotor and can function as a motor and as a generator. Namely, the rotors of the first and second motor-generators 2 and 3 are driven by electric power supplied from a battery 6 through a power control unit (PCU) 5 to coils of the stators. In such case, the first and second motor-generators 2 and 3 function as motors.

On the other hand, when rotating shafts 2a and 3a of rotors of the first and second motor-generators 2 and 3 are driven by external forces, the first and second motor-generators 2 and 3 generate electric power that is applied through the power control unit 5 to charge the battery 6. In such case, the first and second motor-generators 2 and 3 function as generators. During normal vehicle traveling, such as during cruising or acceleration, for example, the first motor-generator 2 functions chiefly as a generator and the second motor-generator 3 functions chiefly as a motor. The power control unit 5 incorporates an inverter controlled by instructions from the controller 4 so as to individually control output torque or regenerative torque of the first motor-generator 2 and the second motor-generator 3.

The first motor-generator 2 and the second motor-generator 3 are coaxially installed at spaced locations. The first motor-generator 2 and second motor-generator 3 are, for example, housed in a common case 7, and a space SP between them is enclosed by the case 7. Optionally, the first motor-generator 2 and second motor-generator 3 can be housed in separate cases.

The first planetary gear mechanism 10 and second planetary gear mechanism 20 are installed in the space SP between the first motor-generator 2 and second motor-generator 3. Specifically, the first planetary gear mechanism 10 is situated on the side of the first motor-generator 2 and the second planetary gear mechanism 20 on the side of the second motor-generator 3.

The first planetary gear mechanism 10 includes a first sun gear 11 and a first ring gear 12 installed around the first sun gear 11, both of which rotate around axis CL1, multiple circumferentially spaced first pinions (planetary gears) 13 installed between the first sun gear 11 and first ring gear 12 to mesh with these gears 11 and 12, and a first carrier 14 that supports the first pinions 13 to be individually rotatable around their own axes and collectively revolvable around axis CL1.

Similarly to the first planetary gear mechanism 10, the second planetary gear mechanism 20 includes a second sun gear 21 and a second ring gear 22 installed around the second sun gear 21, both of which rotate around axis CL1, multiple circumferentially spaced second pinions (planetary gears) 23 installed between the second sun gear 21 and second ring gear 22 to mesh with these gears 21 and 22, and a second carrier 24 that supports the second pinions 23 to be individually rotatable around their own axes and collectively revolvable around axis CL1.

The output shaft 1a of the engine 1 is connected to the first carrier 14, and power of the engine 1 is input to the first planetary gear mechanism 10 through the first carrier 14. On the other hand, when the engine 1 is started, power from the first motor-generator 2 is input to the engine 1 through the first planetary gear mechanism 10. The first carrier 14 is connected to a one-way clutch 15 provided on an inner peripheral surface of a surrounding wall of the case 7. The one-way clutch 15 allows forward rotation of the first carrier 14, i.e., rotation in same direction as that of the engine 1, and prohibits reverse rotation. Provision of the one-way clutch 15 prevents the engine 1 from being reversely rotated by reverse torque acting through the first carrier 14.

The first sun gear 11 is connected to the rotating shaft 2a of the rotor of the first motor-generator 2, and the first sun gear 11 and first motor-generator 2 (rotor) rotate integrally. The first ring gear 12 is connected to the second carrier 24, and the first ring gear 12 and second carrier 24 rotate integrally. Owing to this configuration, the first planetary gear mechanism 10 can output power received from the first carrier 14 through the first sun gear 11 to the first motor-generator 2 and output power through the first ring gear 12 to the second carrier 24 on an axle 57 side. In other words, it can dividedly output power from the engine 1 to the first motor-generator 2 and the second planetary gear mechanism 20.

An axis CL1-centered substantially cylindrical outer drum 25 is provided radially outside the second ring gear 22. The second ring gear 22 is connected to and rotates integrally with the outer drum 25. A brake mechanism 30 is provided radially outward of the outer drum 25. The brake mechanism 30 is, for example, structured as a multi-plate wet brake including multiple radially extending plates (friction members) 31 arranged in axial direction and multiple radially extending disks (friction members) 32 arranged in axial direction (multiple illustration is omitted in the drawing). The plates 31 and disks 32 are alternately arranged in axial direction.

The multiple plates 31 are circumferentially non-rotatably and axially movably engaged at their radial outer ends with the inner peripheral surface of the surrounding wall of the case 7. The multiple disks 32 rotate integrally with the outer drum 25 owing to their radially inner ends being engaged with outer peripheral surface of the outer drum 25 to be circumferentially non-rotatable and axially movable relative to the outer drum 25. A non-contact rotational speed sensor 35 for detecting rotational speed of the outer drum 25 is provided on inner peripheral surface of the case 7 to face outer peripheral surface of the outer drum 25 axially sideward of the brake mechanism 30.

The brake mechanism 30 includes a spring (not shown) for applying biasing force acting to separate the plates 31 and disks 32 and thus release the disks 32 from the plates 31, and a piston (not shown) for applying pushing force acting against the biasing force of the spring to engage the plates 31 and disks 32. The piston is driven by hydraulic pressure supplied through a hydraulic pressure control unit 8. In a state with no hydraulic pressure acting on the piston, the plates 31 and disks 32 separate, thereby releasing (turning OFF) the brake mechanism 30 and allowing rotation of the second ring gear 22. On the other hand, when hydraulic pressure acts on the piston, the plates 31 and disks 32 engage, thereby operating (turning ON) the brake mechanism 30. In this state, rotation of the second ring gear 22 is prevented.

An axis CL1-centered substantially cylindrical inner drum 26 is provided radially inward of and facing the outer drum 25. The second sun gear 21 is connected to an output shaft 27 of a second planetary gear mechanism 20 that extends along axis CL1 and is connected to the inner drum 26, whereby the second sun gear 21, output shaft 27 and inner drum 26 rotate integrally. A clutch mechanism 40 is provided between the outer drum 25 and the inner drum 26.

The clutch mechanism 40 is, for example, structured as a multi-plate wet clutch including multiple radially extending plates (friction members) 41 arranged in axial direction and multiple radially extending disks (friction members) 42 arranged in axial direction (multiple illustration is omitted in the drawing). The plates 41 and disks 42 are alternately arranged in axial direction. The multiple plates 41 rotate integrally with the outer drum 25 owing to their radial outer ends being engaged with the inner peripheral surface of the outer drum 25 to be circumferentially non-rotatable and axially movable relative to the outer drum 25. The multiple disks 42 rotate integrally with the inner drum 26 owing to their radially inner ends being engaged with outer peripheral surface of the inner drum 26 to be circumferentially non-rotatable and axially movable relative to the inner drum 26.

The clutch mechanism 40 includes a spring (not shown) for applying biasing force acting to separate the plates 41 and disks 42 and thus release the disks 42 from the plates 41, and a piston (not shown) for applying pushing force acting against the biasing force of the spring to engage the plates 41 and disks 42. The piston is driven by hydraulic pressure supplied through the hydraulic pressure control unit 8.

In a state with no hydraulic pressure acting on the piston, the plates 41 and disks 42 separate, thereby releasing (turning OFF) the clutch mechanism 40 and allowing relative rotation of the second sun gear 21 with respect to the second ring gear 22. When rotation of the second ring gear 22 is prevented by the brake mechanism 30 being ON at this time, rotation of the output shaft 27 with respect to the second carrier 24 is accelerated. This state corresponds to speed ratio stage being shifted to high.

On the other hand, when hydraulic pressure acts on the piston, the plates 41 and disks 42 engage, thereby operating (turning ON) the clutch mechanism 40 and integrally joining the second sun gear 21 and second ring gear 22. When rotation of the second ring gear 22 is allowed by the brake mechanism 30 being OFF at this time, the output shaft 27 becomes integral with the second carrier 24 and rotates at the same speed as the second carrier 24. This state corresponds to speed ratio stage being shifted to low.

The second planetary gear mechanism 20, brake mechanism 30 and clutch mechanism 40 configure a speed change mechanism 70 that shifts rotation of the second carrier 24 between two speed stages (high and low) and outputs the shifted rotation from the output shaft 27.

The output shaft 27 is connected through a one-way clutch 50 to an output gear 51 centered on axis CL1. The one-way clutch 50 allows forward rotation of the output gear 51 with respect to the output shaft 27, i.e., relative rotation corresponding to vehicle forward direction, and prohibits rotation corresponding to vehicle reverse direction. In other words, when rotational speed of the output shaft 27 corresponding to vehicle forward direction is faster than rotational speed of the output gear 51, the one-way clutch 50 locks, whereby the output shaft 27 and output gear 51 rotate integrally. On the other hand, when rotational speed of the output gear 51 corresponding to vehicle forward direction is faster than rotational speed of the output shaft 27, the one-way clutch 50 disengages (unlocks), whereby the output gear 51 freely rotates with respect to the output shaft 27 without torque pulled back.

A rotating shaft 3a of the rotor of the second motor-generator 3 is connected to the output gear 51, so that the output gear 51 and the second motor-generator 3 (rotating shaft 3a) rotate integrally. Since the one-way clutch 50 is interposed between the output shaft 27 and the rotating shaft 3a, forward relative rotation of the rotating shaft 3a with respect to the output shaft 27 is allowed. In other words, when rotational speed of the second motor-generator 3 is faster than rotational speed of the output shaft 27, the second motor-generator 3 efficiently rotates without torque of the output shaft 27 (second planetary gear mechanism 20) pulled back. The one-way clutch 50 is installed radially inward of the rotating shaft 3a. Since axial length of the drive system 100 can therefore be minimized, a smaller drive system 100 can be realized.

An oil pump (MOP) 60 is installed radially inward of the rotor of the second motor-generator 3. The oil pump 60 is connected to the output shaft 1a of the engine 1 and driven by the engine 1. Oil supply necessary when the engine 1 is stopped is covered by driving an electric pump (EOP) 61 with power from the battery 6.

A large-diameter gear 53 rotatable around a counter shaft 52 lying parallel to axis CL1 meshes with the output gear 51, and torque is transmitted to the counter shaft 52 through the large-diameter gear 53. Torque transmitted to the counter shaft 52 is transmitted through a small-diameter gear 54 to a ring gear 56 of a differential unit 55 and further transmitted through the differential unit 55 to the left and right axles (drive shaft) 57. Since this drives the front wheels 101, the vehicle travels. The rotating shaft 3a, output gear 51, large-diameter gear 53, small-diameter gear 54 and differential unit 55, inter alia, configure a power transmission path 71 between the output shaft 27 and the axles 57.

The hydraulic pressure control unit 8 includes electromagnetic valve, proportional electromagnetic valve, and other control valves actuated in accordance with electric signals. These control valves operate to control hydraulic pressure flow to the brake mechanism 30, clutch mechanism 40 and the like in accordance with instructions from the controller 4. This enables ON-OFF switching of the brake mechanism 30 and clutch mechanism 40.

The controller (ECU) 4 as an electric control unit incorporates an arithmetic processing unit having a CPU, ROM, RAM and other peripheral circuits, and the CPU includes an engine control ECU 4a, a speed change mechanism control ECU 4b and a motor-generator ECU 4c. Alternatively, the multiple ECUs 4a to 4c need not be incorporated in the single controller 4 but can instead be provided as multiple discrete controllers 4 corresponding to the ECUs 4a to 4c.

The controller 4 receives as input signals from, inter alia, the rotational speed sensor 35 for detecting rotational speed of the drum 25, a vehicle speed sensor 36 for detecting vehicle speed, an accelerator opening angle sensor 37 for detecting accelerator opening angle indicative of amount of accelerator pedal depression, and an engine speed sensor 38 for detecting rotational speed of the engine 1. Although not indicated in the drawings, the controller 4 also receives signals from a sensor that detects rotational speed of the first motor-generator 2 and a sensor that detects rotational speed of the second motor-generator 3.

Based on these input signals, the controller 4 decides drive mode in accordance with a predefined driving force map representing vehicle driving force characteristics defined in terms of factors such as vehicle speed and accelerator opening angle. In order to enable the vehicle to travel in the decided drive mode, the controller 4 controls operation of the engine 1, first and second motor-generators 2 and 3, the brake mechanism 30 and the clutch mechanism 40 by outputting control signals to, inter alia, an actuator for regulating throttle valve opening, an injector for injecting fuel, the power control unit 5 and the hydraulic pressure control unit 8 (control valve).

Figures 2, 3:
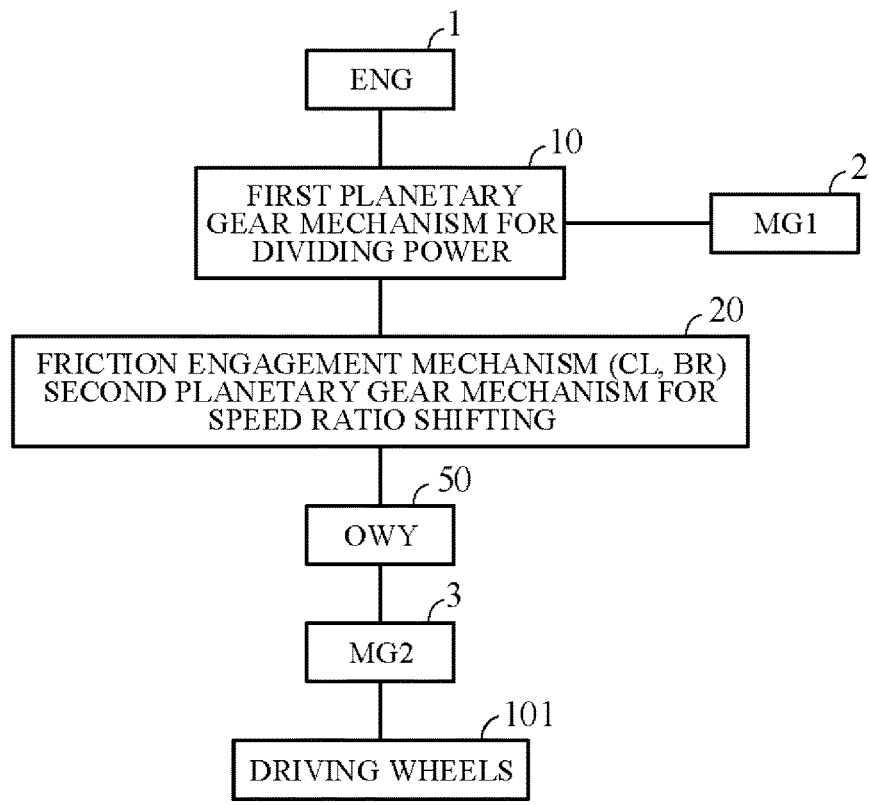
FIG. 2 is a diagram showing an interconnection of main components of the drive system of the hybrid vehicle according to the embodiment of the invention.
FIG. 3 is a diagram an example of drive modes implemented by the drive system of the hybrid vehicle according to the embodiment of the invention.

FIG. 2 is a drawing summarizing interconnection of main components of the drive system 100. As shown in FIG. 2, the first planetary gear mechanism 10 for dividing engine power is connected to the engine 1. The first motor-generator 2 and second planetary gear mechanism 20 for speed ratio shifting are connected to the first planetary gear mechanism 10. The second motor-generator 3 is connected through the one-way clutch 50 to the second planetary gear mechanism 20, and the front wheels 101 are connected to the second motor-generator 3 as drive wheels.

FIG. 3 is a table showing examples of some drive modes that can be implemented by the drive system 100 according to this embodiment of the present invention, along with operating states of the brake mechanism (BR) 30, clutch mechanism (CL) 40, one-way clutch (OWY) 50 and engine (ENG) 1 corresponding to the different modes.

In FIG. 3, EV mode, W motor mode, series mode and HV mode are shown as typical drive modes. HV mode is subdivided into low mode (HV low mode) and high mode (HV high mode). In the drawing, brake mechanism 30 ON (Engaged), clutch mechanism 40 ON (Engaged), one-way clutch 50 Locked, and engine 1 Operating are indicated by symbol ○, while brake mechanism 30 OFF (Disengaged), clutch mechanism 40 OFF (Disengaged), one-way clutch 50 Unlocked, and engine 1 Stopped are indicated by symbol ×.

Figure 4:
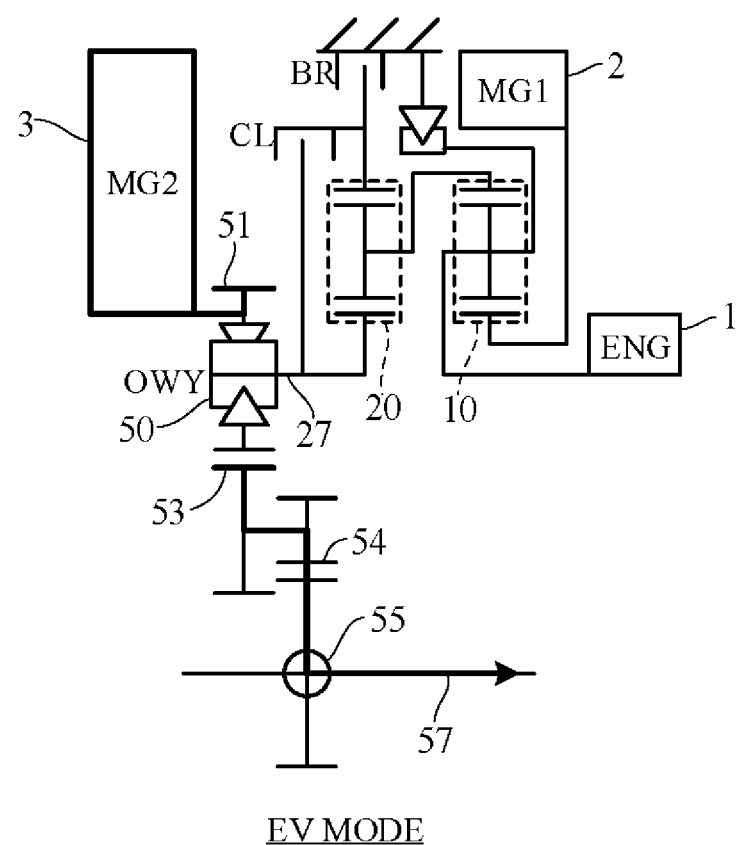
FIG. 4 is a skeleton diagram showing a flow of torque transmission in EV mode in the drive system of FIG. 1.

In EV mode, vehicle traveling is powered solely by motive power of the second motor-generator 3. As shown in FIG. 3, in EV mode, the brake mechanism 30 and clutch mechanism 40 are both OFF, and the engine 1 is Stopped, in accordance with instructions from the controller 4. FIG. 4 is a skeleton diagram showing flow of torque transmission in EV mode.

As show in FIG. 4, in EV mode, torque output from the second motor-generator 3 is transmitted through the output gear 51, large-diameter gear 53, small-diameter gear 54 and differential unit 55 to the axles 57. At this time, the output shaft 27 stays stopped under action of the one-way clutch 50 and efficient vehicle running can be achieved without torque pulled back (rotational resistance) attributable to rotating elements upstream of the second motor-generator 3 (on second planetary gear mechanism side).

Figure 5:
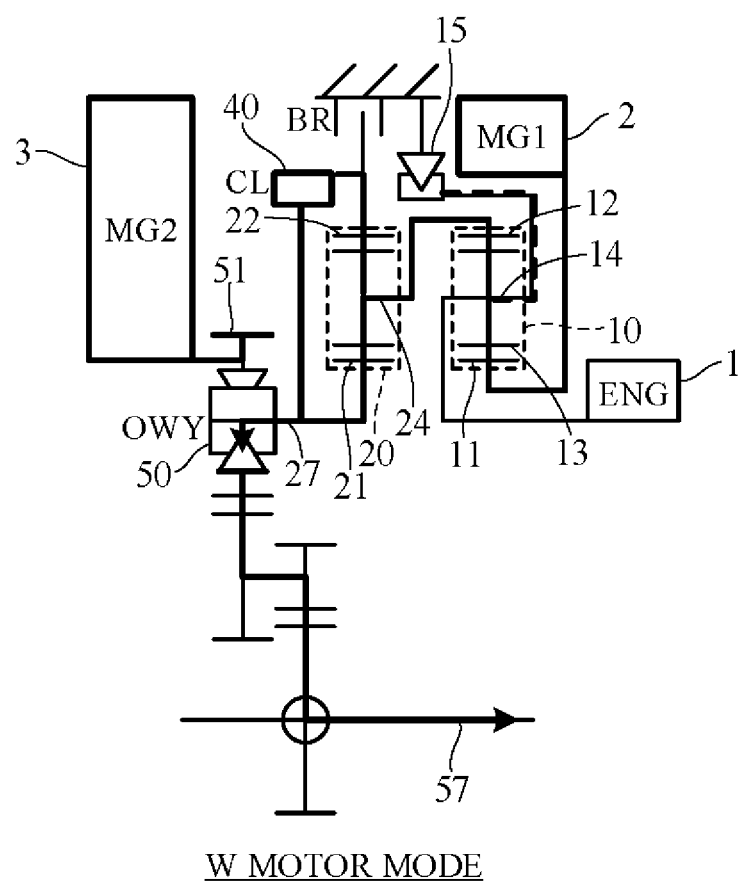
FIG. 5 is a skeleton diagram showing a flow of torque transmission in W motor mode in the drive system of FIG. 1.

In W motor mode, vehicle traveling is powered by motive power of the first motor-generator 2 and the second motor-generator 3. As shown in FIG. 3, in W motor mode, the brake mechanism 30 is OFF, the clutch mechanism 40 is ON and the engine 1 is Stopped, in accordance with instructions from the controller 4. FIG. 5 is a skeleton diagram showing flow of torque transmission in W motor mode.

As show in FIG. 5, in W motor mode, rotation of the first carrier 14 is prevented by action of the one-way clutch 15, and torque output from the first motor-generator 2 is transmitted through the first sun gear 11, first pinions 13, first ring gear 12, second carrier 24 (second carrier 24 rotating integrally with the second sun gear 21 and second ring gear 22) to the output shaft 27. Torque transmitted to the output shaft 27 is transmitted through the locked one-way clutch 50 to the output gear 51, and transmitted to the axles 57 together with torque output from the second motor-generator 3. Since torque from the first motor-generator 2 and second motor-generator 3 is applied to the axles 57 in this manner in W motor mode, propelling force can be increased to greater than in EV mode.

Figure 6:
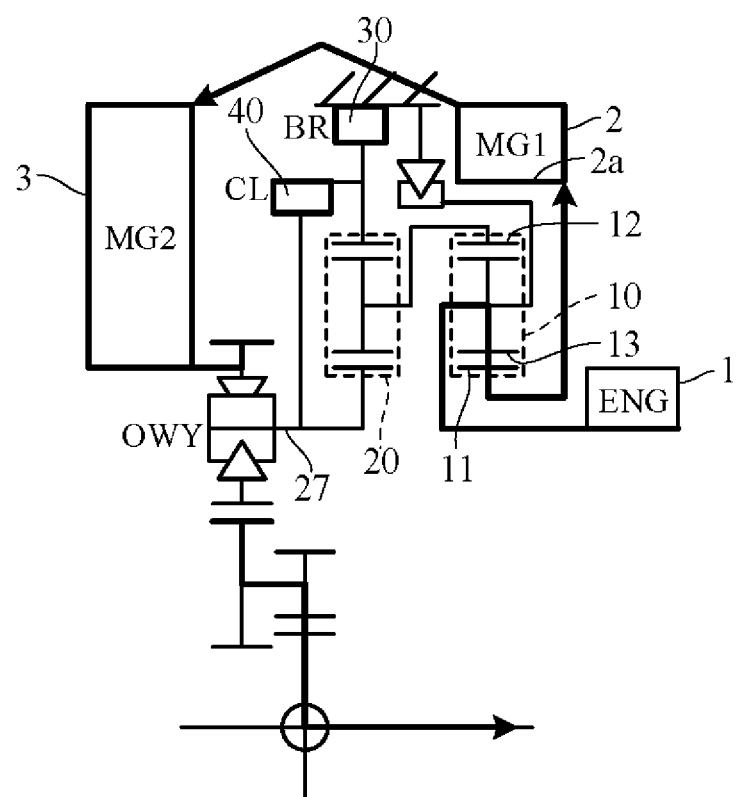
FIG. 6 is a skeleton diagram showing a flow of torque transmission in series mode in the drive system of FIG. 1.

In series mode, vehicle traveling is powered by motive power of the second motor-generator 3 while the first motor-generator 2 is being driven by motive power from the engine 1 to generate electric power. As shown in FIG. 3, in series mode, the brake mechanism 30 and clutch mechanism 40 are both ON and the engine 1 is operated, in accordance with instructions from the controller 4. FIG. 6 is a skeleton diagram showing flow of torque transmission in series mode.

As shown in FIG. 6, in series mode, rotation from the first ring gear 12 to as far as the output shaft 27 is stopped, so that all power output from the engine 1 is input through the first pinions 13 and first sun gear 11 to the rotor rotating shaft 2a of the first motor-generator 2. The first motor-generator 2 is therefore driven to generate electric power and this generated electric power is used to drive the second motor-generator 3, whereby the vehicle can travel. In other words, an electrical path is structured for supplying electrical energy generated by the first motor-generator 2 to the second motor-generator 3, whereby running of the vehicle is driven by the second motor-generator 3. In series mode, as in EV mode, pull back of torque is prevented by action of the one-way clutch 50. Amount of power supplied to the second motor-generator 3 through the electrical path is not greater than allowable output of the power control unit 5.

In HV mode, vehicle traveling is powered by motive power produced by the engine 1 and the second motor-generator 3. Within the HV mode, the HV low mode corresponds to a mode of wide-open acceleration from low speed, and the HV high mode corresponds to a mode of normal traveling after EV traveling. As shown in FIG. 3, in HV low mode, the brake mechanism 30 is OFF, the clutch mechanism 40 is ON and the engine 1 is operated, in accordance with instructions from the controller 4. In HV high mode, the brake mechanism 30 is ON, the clutch mechanism 40 is OFF and the engine 1 is operated, in accordance with instructions from the controller 4.

Figure 7:
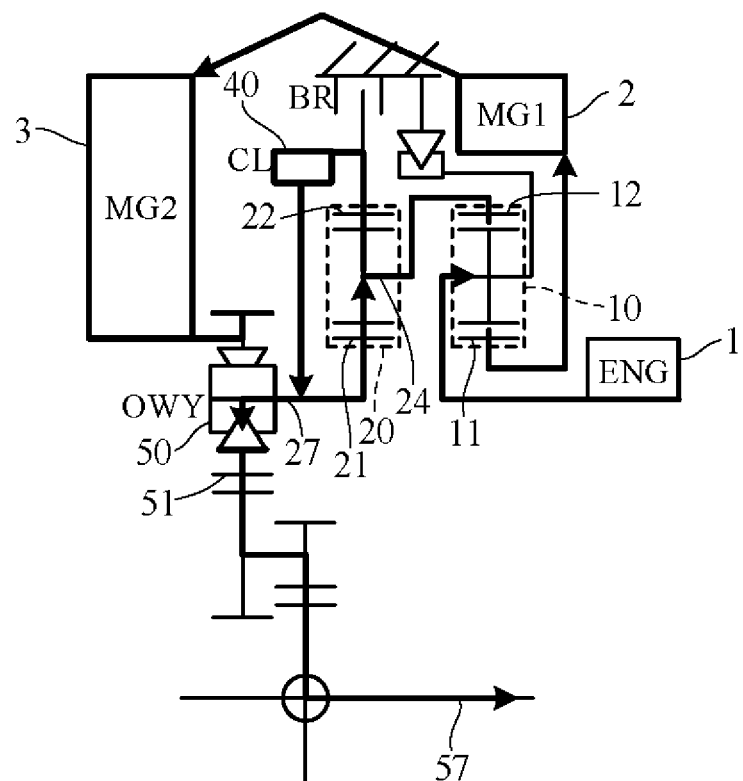
FIG. 7 is a skeleton diagram showing a flow of torque transmission in HV low mode in the drive system of FIG. 1.

FIG. 7 is a skeleton diagram showing flow of torque transmission in HV low mode. As shown in FIG. 7, in HV low mode, some torque output from the engine 1 is transmitted through the first sun gear 11 to the first motor-generator 2. As a result, the battery 6 is charged by power generated by the first motor-generator 2, and, in addition, electrical drive power is supplied from the battery 6 to the second motor-generator 3.

In HV low mode, remainder of torque output from the engine 1 is transmitted through the first ring gear 12 and the second carrier 24 (second carrier 24 rotating integrally with the second sun gear 21 and second ring gear 22) to the output shaft 27. Rotational speed of the output shaft 27 at this time is equal to rotational speed of the second carrier 24. Torque transmitted to the output shaft 27 is transmitted through the locked one-way clutch 50 to the output gear 51, and transmitted to the axles 57 together with torque output from the second motor-generator 3. This enables high-torque vehicle running using torque from the engine 1 and second motor-generator 3, while maintaining sufficient battery residual charge with power generated by the first motor-generator 2.

Figure 8:
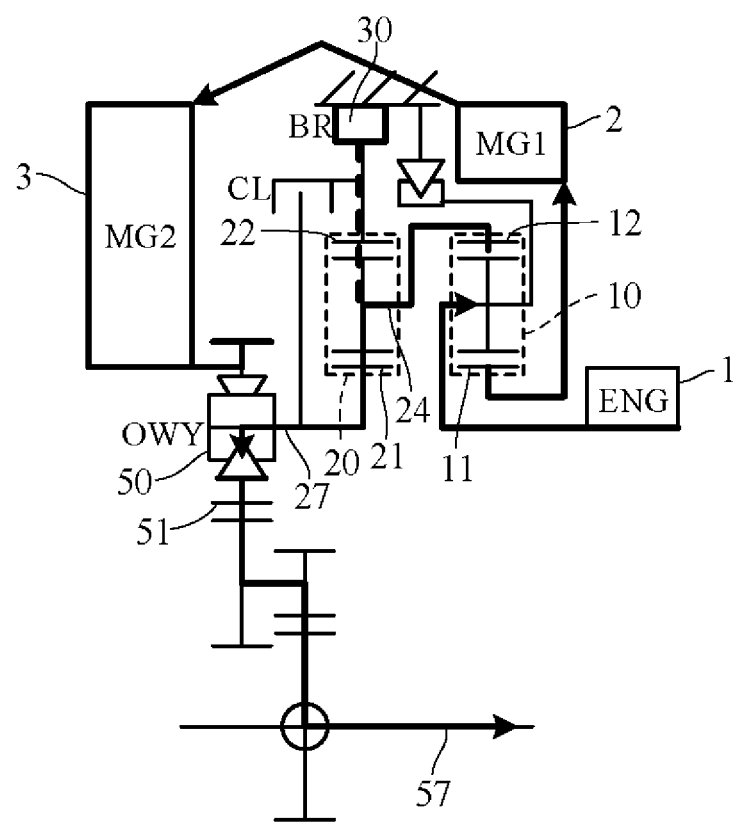
FIG. 8 is a skeleton diagram showing a flow of torque transmission in HV high mode in the drive system of FIG. 1.

FIG. 8 is a skeleton diagram showing flow of torque transmission in HV high mode. As shown in FIG. 8, in HV high mode, similarly to in HIV low mode, some torque output from the engine 1, for example, is transmitted through the first sun gear 11 to the first motor-generator 2. Remainder of torque output from the engine 1 is transmitted through the first ring gear 12, second carrier 24 and second sun gear 21 to the output shaft 27. Rotational speed of the output shaft 27 at this time is greater than rotational speed of the second carrier 24.

Torque transmitted to the output shaft 27 is transmitted through the locked one-way clutch 50 to the output gear 51, and transmitted to the axles 57 together with torque output from the second motor-generator 3. Therefore, by utilizing torque from the engine 1 and second motor-generator 3 while maintaining sufficient battery residual charge, vehicle running can be achieved at torque that, while lower than that in HV low mode, is higher than that in EV mode. Since rotation of the output shaft 27 is speeded up by the second planetary gear mechanism 20 in HV high mode, running at lower engine speed than in HV low mode can be realized.

The drive system 100 according to the present embodiment is characterized by speed ratio shifting from HV high mode to HV low mode and from HV low mode to HV high mode in response to instruction from the controller 4. This speed ratio shifting is explained in the following.

Figure 9A:
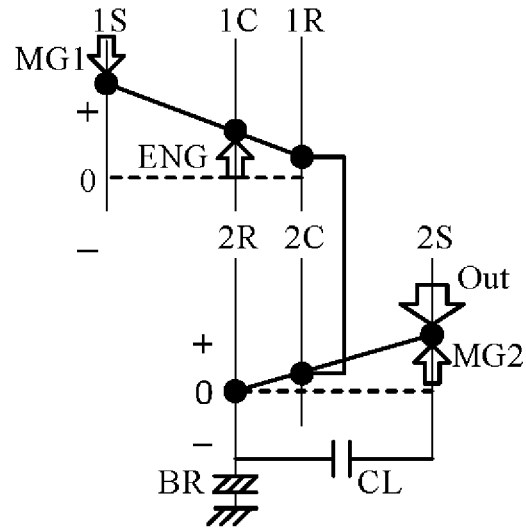
FIG. 9A is an alignment chart showing an example of operation in HV high mode.
Figure 9B:
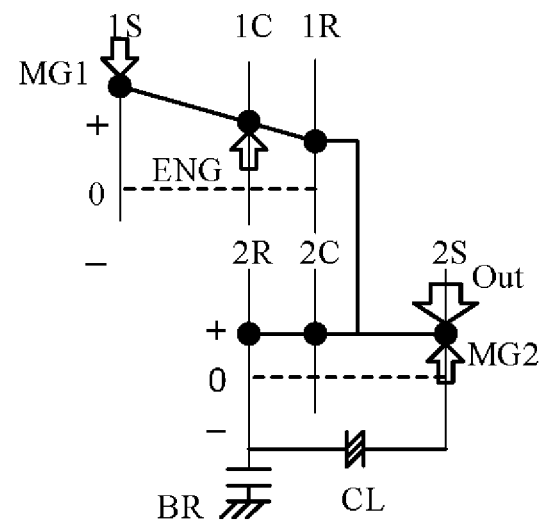
FIG. 9B is an alignment chart showing an example of operation in HV low mode.

FIGS. 9A and 9B are diagrams showing examples of HV high mode and HV low mode alignment charts. In these charts, first sun gear 11, first carrier 14 and first ring gear 12 are represented by symbols 1S, 1C and 1R, and second sun gear 21, second carrier 24 and second ring gear 22 are represented by symbols 2S, 2C and 2R. Rotation direction of the first ring gear 12 and second carrier 24 during forward vehicle movement is defined as positive direction. Forward direction is indicated by symbol + and torque acting in forward direction is indicated by upward pointing arrow.

As shown in FIG. 9A, in HV high mode, the hydraulic pressure control unit 8 responds to instruction from the controller 4 by controlling the brake mechanism 30 and the clutch mechanism 40 so as to turn the brake mechanism 30 (BR) ON and the clutch mechanism 40 (CL) OFF. In this state, the engine 1 rotates the first carrier 14 (1C) in positive direction, whereby the first motor-generator 2 (MG1) is rotationally driven to generate electricity, and the first ring gear 12 (1R) is rotated in positive direction. Since rotation of the second ring gear 22 (2R) is prevented at this time, the second sun gear 21 (2S) rotates faster than the second carrier 24 (2C) and vehicle travels by this rotational torque and torque of the second motor-generator 3 (MG2).

When required driving force increases during vehicle speed increase, the controller 4 switches drive mode from HV high mode to HV low mode, for example. As shown in FIG. 9B, in HV low mode, the brake mechanism 30 (BR) is turned OFF and the clutch mechanism 40 (CL) is turned ON by action of the hydraulic pressure control unit 8 in response to instruction from the controller 4. In this state, the engine 1 rotates the first carrier 14 (1C) in positive direction, whereby the first motor-generator 2 (MG1) is rotationally driven to generate electricity, and the first ring gear 12 (1R) is rotated in positive direction. Since the second carrier 24 (2C), second sun gear 21 (2S) and second ring gear 22 (2R) are integrated at this time, the second sun gear 21 (2S) rotates at the same speed as the second carrier 24 (2C), and vehicle travels by this rotational torque and torque of the second motor-generator 3 (MG2).

Switching from HV high mode to HV low mode can be achieved, similarly to in conventional ordinary switching, by turning the clutch mechanism 40 ON after starting to turn the brake mechanism 30 OFF. Moreover, in the present embodiment, mode switching can also be achieved by turning the brake mechanism 30 and the clutch mechanism 40 ON and thereafter turning the brake mechanism 30 OFF. In other words, switching to HV low mode can also be performed by turning the clutch mechanism 40 ON to once switch from HV high mode to series mode, and thereafter turning the brake mechanism 30 OFF. Similarly, switching from HV low mode to HV high mode can also be realized by turning the brake mechanism 30 and clutch mechanism 40 ON and thereafter turning the clutch mechanism 40 OFF. In other words, switching to HV high mode can also be performed by turning the brake mechanism 30 ON to once switch from HV low mode to series mode, and thereafter turning the clutch mechanism 40 OFF.

Figure 10A:
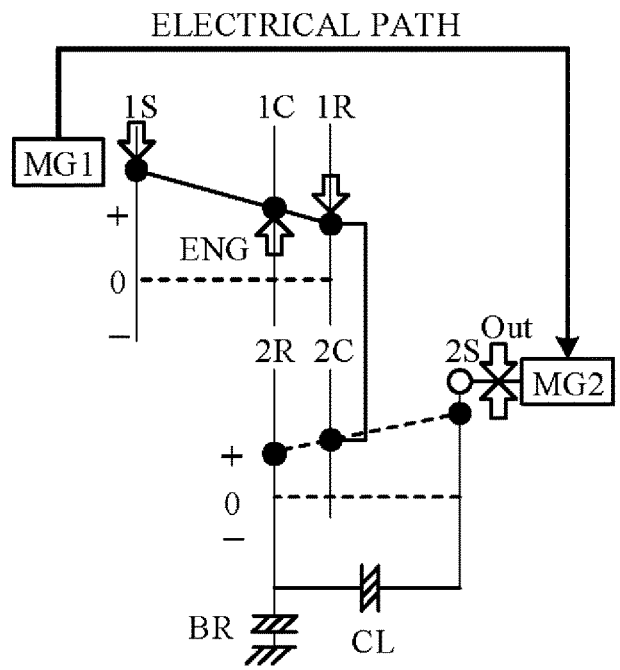
FIG. 10A is an alignment chart showing an example of an action in a course of switching from HV high mode to HV low mode.
Figure 10B:
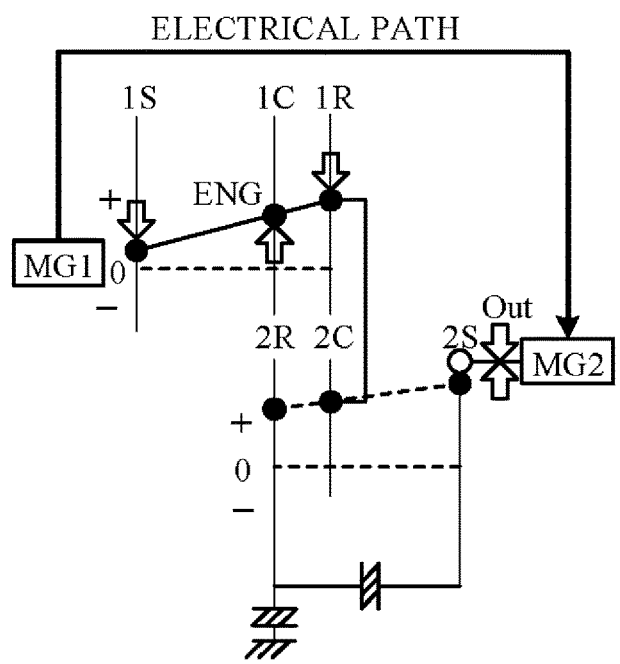
FIG. 10B is an alignment chart showing an example of an action following the action of FIG. 10A.

FIGS. 10A and 10B are alignment charts showing examples of actions in the course of switching from HV high mode to HV low mode. The actions of FIG. 10B follow the actions of FIG. 10A. Blank circles in the drawings correspond to rotational speed of the rotating shaft 3a of the second motor-generator 3. As shown in FIGS. 10A and 10B, engaging force occurs in both the brake mechanism 30 (BR) and the clutch mechanism 40 (CL) in response to instruction from the controller 4 during switching from HV high mode to HV low mode. More exactly, the clutch mechanism 40 gradually switches from disengaging side to engaging side while the brake mechanism 30 is gradually switching from engaging side to disengaging side.

At this time, the one-way clutch 50 assumes unlocked state and rotational speed of the second sun gear 21 (2S), i.e., rotational speed of the output shaft 27, falls lower than rotational speed of the rotating shaft 3a of the second motor-generator 3. A state of no mechanical driving torque from the engine 1 (ENG) being applied to the axles 57 therefore arises, but the controller 4 controls the power control unit 5 so as to supply equivalent compensating electrical energy generated by the first motor-generator 2 to the second motor-generator 3. Driving torque of the second motor-generator 3 therefore increases to enable the vehicle to generate desired vehicle propulsion torque matched to required driving force.

Figure 11A:
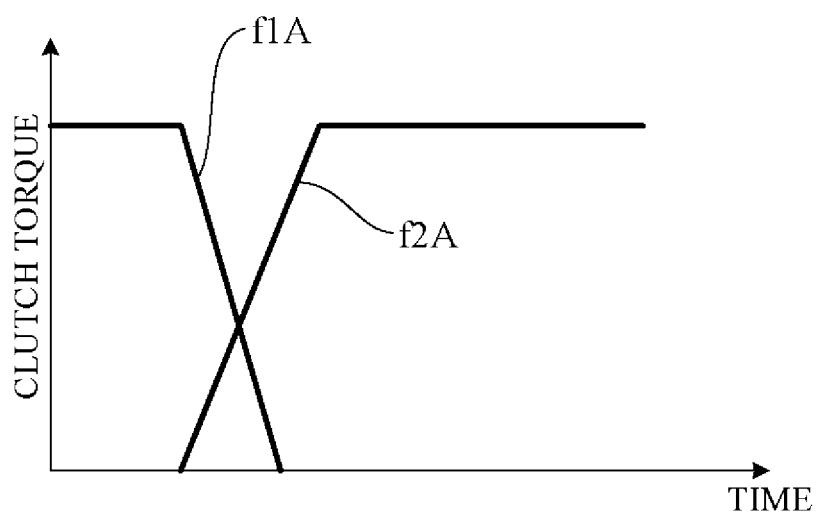
FIG. 11A is a diagram showing an example of performance characteristic of a brake mechanism and clutch mechanism of the drive system according to the embodiment of the invention.
Figure 11B:
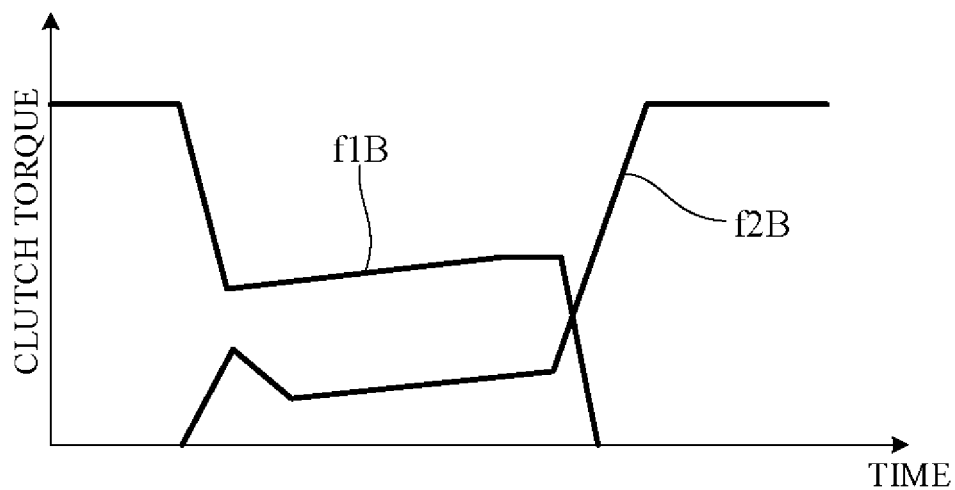
FIG. 11B is a diagram showing a comparative example of FIG. 11A.

FIG. 11A is a diagram showing an example of performance characteristics of the brake mechanism 30 and the clutch mechanism 40 during switching from HV high mode to HV low mode, and FIG. 11B is a diagram showing an example for comparison therewith. FIG. 11B shows an example of typical performance characteristics of a pair of frictional engagement mechanisms (first frictional engagement mechanism and second frictional engagement mechanism) each including multiple frictional engagement elements and constituting a brake mechanism or a clutch mechanism. The characteristics of FIG. 11B will be explained first. Both of the frictional engagement mechanisms are configured similarly to the brake mechanism 30 and the clutch mechanism 40 of the present embodiment so that clutch torque transmitted between frictional engagement elements (torque capacity) is maximum when the multiple frictional engagement elements engage and clutch torque is minimum when they are disengaged.

Characteristic curves f1B and f2B of FIG. 11B show time-course change of clutch torque of the first frictional engagement mechanism and second frictional engagement mechanism when clutch-to-clutch shifting is performed by clutch-switching between the disengage-side first frictional engagement mechanism and the engage-side second frictional engagement mechanism. For convenience of explanation, characteristic curves f1B and f2B are assigned identical maximum values. Characteristic curves f1A and f2A of FIG. 11A are the same in this regard.

As shown in FIG. 11B, during downshifting, disengage-side high-speed range clutch torque (curve f1B) is first lowered to a predetermined value, held at low pressure of the predetermined value, and thereafter reduced toward $_0$. At this time, desired engine speed is increased in accordance with downshifted state. On the other hand, engage-side low-speed range clutch torque (curve f2B) is increased concurrently with reduction of disengaging side clutch torque toward 0. Re-expressing this action from another viewpoint, friction element engaging force is eased in preceding stage (on high side) to progressively increase differential rotation between friction elements under clutch partially engaged condition and input of engine torque, and preceding stage (high side) friction elements are completely disengaged and succeeding stage (low side) friction elements engaged when the differential rotation reaches state of differential rotation at time of succeeding stage (low side) engagement. This enables the succeeding stage (low side) friction elements to engage (work) in a state of substantially no differential rotation.

Thus in generally practiced downshifting, when switching between the clutches of the pair of frictional engagement mechanisms is performed, the preceding stage (high side) continuing to receive engine torque reaction force is controlled by partial clutch engagement, whereby a time lag during which differential rotation of friction elements increases comes to be present, but downshifting can be achieved while inhibiting shift shock due to succeeding stage (low side) engagement. In other words, when time of increasing clutch torque on engaging side (low side) is early, negative acceleration owing to pull back of torque in the torque phase or inertia phase may occur and cause shift shock, but shift shock can be inhibited by increasing engaging side clutch torque after waiting for engine speed to increase (convergence of engaging side, i.e., low side, friction element rotation differential of 0). In this case, however, completion of shifting takes a relatively long time, so that prompt downshifting is hard to realize.

In contrast, in the present embodiment, as shown in FIG. 11A, clutch torque of the clutch mechanism 40 is increased during shifting from HV high mode to HV low mode without maintaining low-pressure clutch torque of the disengaging side brake mechanism 30. In other words, clutch torque of the clutch mechanism 40 is, as indicated by curve f2A, increased correspondingly with decrease of clutch torque of the brake mechanism 30 as indicated by curve f1A. Since this shortens time required for downshifting, highly responsive switching from HV high mode to HV low mode can be realized.

In other words, when mode is switched between HV low mode and HV high mode in the present embodiment, drive mode only once switches to series mode even if the pair of engaging elements (brake mechanism 30 and clutch mechanism 40) are simultaneously engaged. It is therefore possible by action of the one-way clutch 50 to inhibit occurrence of negative acceleration caused by pull back of torque in torque phase or inertia phase as occurs in so-called clutch-to-clutch control. Speed ratio stage can therefore be switched smoothly with good responsiveness.

As indicated by the change from FIG. 10A to FIG. 10B, rotational speed of the first motor-generator 2 decreases during downshifting. Since electric power can be supplied from the first motor-generator 2 to the second motor-generator 3 through the electrical path at this time, the aforesaid downshifting via series mode is performed on condition of rotational speed of the first motor-generator 2 after downshifting being 0 or greater. Moreover, when power generation by the first motor-generator 2 is deficient, the aforesaid downshifting via series mode is performed only insofar as driving torque required in the second motor-generator 3 can be obtained using assistance from the battery 6. Operating region within which downshift is performed via series mode is termed "normal region."

Normal region is a region within which required propelling force can be ensured by assistance from the battery 6. In addition, normal region is a region that condition of amount of electric power supplied to the second motor-generator 3 through the electrical path being equal to or less than allowable output of the power control unit 5 is satisfied and condition of rotational speed of the first motor-generator 2 after downshifting being equal to or greater than 0 is satisfied. Normal range is stored in memory of the controller 4 in advance. The controller 4 determines whether operating region is within normal region and performs downshifting in the manner indicated in FIG. 11A when operating region is determined to be within normal region. When, to the contrary, operating region is determined not to be within normal region, downshifting is performed in the manner indicated in FIG. 11B.

Figure 12:
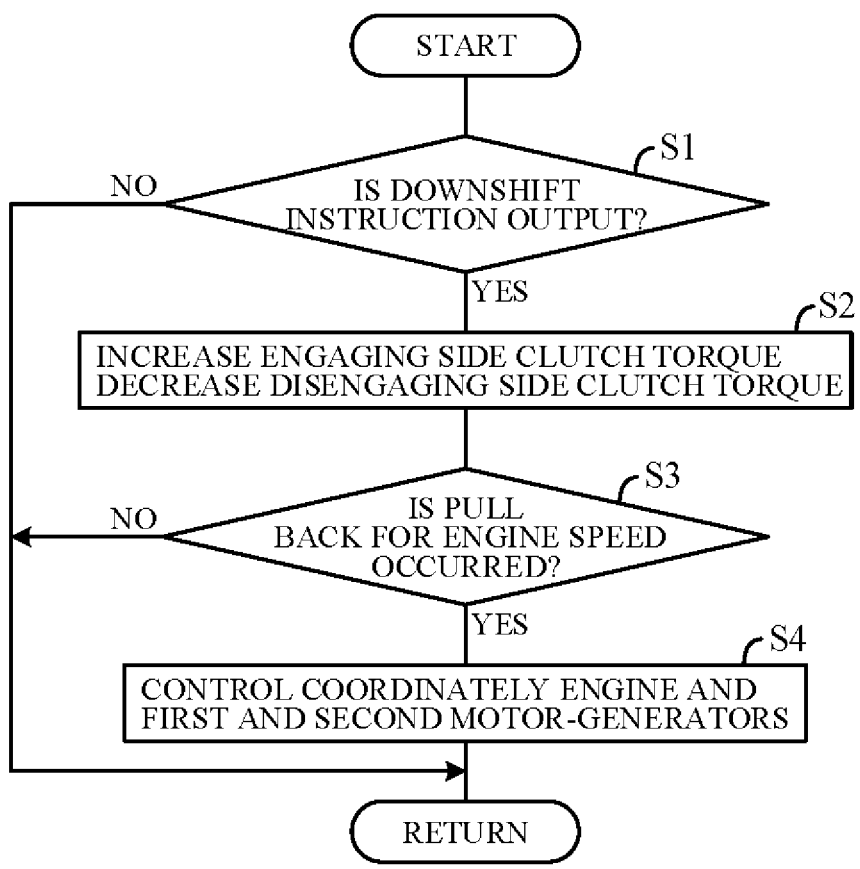
FIG. 12 is a flowchart showing an example of a processing performed by a controller of FIG. 1.

FIG. 12 is a flowchart indicating an example of processing performed by the controller 4 during speed ratio shifting in accordance with a program stored in memory in advance. The processing indicated in this flowchart is performed periodically at predetermined intervals when drive mode is, for example, HV high mode. The processing is terminated when drive mode enters HV low mode after passing through series mode (upon completion of series mode).

First, in S1 (S: processing Step), based on signals from the vehicle speed sensor 36 and the accelerator opening angle sensor 37, whether operating point dependent on vehicle speed and required driving force is moved from HV high mode region to HV low mode region on a predefined driving force map is determined, i.e., whether downshift instruction from a HV high mode to HV low mode is output is determined. When the result in S1 is YES, the program goes to S2, and when NO, returns to S1.

In S2, a control signal is output to a control valve of the hydraulic pressure control unit 8 to control hydraulic pressure for driving the piston of the clutch mechanism 40 (clutch pressure) so as to increase clutch torque of the clutch mechanism 40, namely, engaging side clutch torque, by a predetermined ratio, as indicated by curve f2A of FIG. 11A. In addition, a control signal is output to a control valve of the hydraulic pressure control unit 8 to control hydraulic pressure for driving the piston of the brake mechanism 30 (clutch pressure) so as to decrease clutch torque of the brake mechanism 30, namely, disengaging side clutch torque, by a predetermined ratio, as indicated by curve f1A of FIG. 11A.

Next, in S3, whether decrease of engine speed Ne detected by the engine speed sensor 38 is equal to or greater than predetermined value is determined, i.e., whether pull back for engine speed Ne is occurred is determined. If a positive decision is made in S3, the routine proceeds to S4, and if negative decision is made, returns to S1.

In S4, the engine 1, first motor-generator 2 and second motor-generator 3 are coordinately controlled based on signals from the rotational speed sensor 35 etc. Specifically, the rotational speed sensor 35 detects change of rotational speed of the outer drum 25 of the clutch mechanism 40 in shift transient state (during switching to low or high), and the engine 1, first motor-generator 2 and second motor-generator 3 are coordinately controlled based on the detected value. More exactly, the first motor-generator 2 is first controlled based on engine speed or change in engine speed and the second motor-generator 3 is thereafter subordinately controlled in accordance with resulting behavior of the first motor-generator 2.

Although not indicated in the drawing, processing for switching from HV low mode to HV high mode includes processing responsive to output of an upshift instruction for increasing clutch torque of the brake mechanism 30 (engaging side clutch torque) by a predetermined ratio and decreasing clutch torque of the clutch mechanism 40 (disengaging side clutch torque) by a predetermined ratio. When pull back of engine speed Ne is thereafter detected, processing is included for coordinately controlling the engine 1, first motor-generator 2 and second motor-generator 3.

An explanation of overall operation of the drive system 100 during speed ratio shifting follows. FIG. 13A is a timing chart showing an example of time-course change, during switching from HV high mode to HV low mode, of clutch torque of the brake mechanism 30 (preceding stage torque), clutch torque of the clutch mechanism 40 (succeeding stage torque), engine speed (Ne), engine torque (Te), rotational speed of the rotating shaft 3a of the second motor-generator 3 (MG2 rotational speed), rotational speed of the output shaft 27 input to the one-way clutch 50 (OWY input rotational speed), torque of the second motor-generator 3 (MG2 torque), amount of assistance by electric power supply from the battery 6 to the second motor-generator 3 (battery assist) (electric power supply other than from the first motor-generator 2 through the electrical path), rotational speed of the first motor-generator 2 (MG1 rotational speed), and torque of the first motor-generator 2 (MG1 torque).

FIG. 13A assumes a case of downshifting in response to acceleration demand in which MG2 rotational speed increases gradually at a constant rate over time. The controller 4 outputs shift instructions in accordance with operating points mapped on a predetermined driving force map as a function of vehicle speed and required driving force. Assume, for example, that accelerator depression in HV high mode increases at time t1 and downshifting is instructed when operating point detected by the vehicle speed sensor 36 and accelerator opening angle sensor 37 moves into HV low mode region on the driving force map. The controller 4 therefore responds by increasing clutch torque of the clutch mechanism 40 (succeeding stage torque) and decreasing clutch torque of the brake mechanism 30 (preceding stage torque) (S2). Owing to effect of friction of the second ring gear 22 and/or residual clutch pressure at this time, decrease of preceding stage torque is actually delayed as indicated by a dotted line. In other words, this example relates to a case in which clutch-to-clutch switching progresses while exhibiting a slight locking tendency.

When increase of succeeding stage torque begins under persisting effect of preceding stage brake residual pressure at time t1, resistance force against the engine 1 increases and engine speed Ne decreases. When the engine speed sensor 38 detects that amount of engine speed Ne decrease (change) is equal to or greater than predetermined value (pull back with respect to the engine 1), the controller 4 maintains engine output by increasing engine torque Te (S4). At this time, MG1 rotational speed gradually decreases toward post-downshift state (FIG. 10A→FIG. 10B).

When the rotational speed sensor 35 detects decrease of OWY input rotational speed relative to MG2 rotational speed at time t2, i.e., when it detects unlocked state of the one-way clutch 50, the controller 4 increases MG1 torque to increase power generation (output) of the first motor-generator 2 (equal to multiplication value of MG1 torque and MG1 rotational speed) (S4). This increases MG2 torque and minimizes decrease of vehicle propelling force. Driving in series mode (series HV driving) starts at this time t2. At this point, the controller 4 compensates for deficiency of electric power supplied from the first motor-generator 2 to the second motor-generator 3 through the electrical path by supplying power from the battery 6 to the second motor-generator 3, i.e., it performs battery assist (S4).

When engagement of the clutch mechanism 40 is completed upon torque of the succeeding stage reaching maximum at time t3, engine speed Ne starts to increase in conformity with high Ne state following downshift. At this time, in order to absorb inertia torque of the first motor-generator 2, the controller 4 increases electric power generation in order to increase MG1 torque and decrease MG1 rotational speed along a sharper gradient (S4). In addition, it increases amount of battery assist in order to compensate for deficiency of electric power supplied from the first motor-generator 2 to the second motor-generator 3 through the electrical path (S4). Since decreasing MG1 rotational speed increases OWY input rotational speed (rotational speed of the second sun gear 21) (FIG. 10B), OWY input rotational speed approaches MG2 rotational speed.

When OWY input rotational speed returns to as far as MG2 rotational speed at time t4, the one-way clutch 50 assumes locked state, so that mechanical torque from the engine 1 is added to MG2 torque for output. Series HV driving ends at this time t4. Concurrently, battery assist declines and MG1 torque decreases.

FIG. 13B is a diagram showing an example of an action pattern differing from that of 13A. While in the example of FIG. 13A engine torque Te is increased at time t2 when series HV driving starts, in the example of FIG. 13B engine torque Te is increased later than time t2a when series HV driving starts. In the example of FIG. 13B, the controller 4 lowers MG1 torque (reaction force) and raises MG1 rotational speed at time t2a after starting to increase succeeding stage clutch torque at time t1. Since this lowers rotational speed of the first ring gear 12 (1R), rotational speed of the second sun gear 21 (2S) decreases. Therefore, in the example of FIG. 13B, series HV driving is started earlier than in the example of FIG. 13A.

When MG1 torque decreases at time t2a, output of the first motor-generator 2 decreases. As a result, supply of electric power from the first motor-generator 2 to the second motor-generator 3 through the electrical path decreases. In the example of FIG. 13B, therefore, the controller 4 compensates for deficiency of electric power supplied through the electrical path by increasing battery assist earlier than in the example of FIG. 13A.

The present embodiment can achieve advantages and effects such as the following:

(1) The drive system 100 according to the present embodiment includes the engine 1, the first motor-generator 2 connected to the engine 1, the first planetary gear mechanism 10 for dividing motive power generated by the engine 1 between the first motor-generator 2 and the second carrier 24, the speed change mechanism 70 for shifting speed ratio of rotation of the second carrier 24 and outputting motive power from the output shaft 27 of the speed change mechanism 70, members such as the output gear 51 for forming the power transmission path 71 transmitting motive power output from the output shaft 27 to the axles 57, the second motor-generator 3 having the rotating shaft 3a connected to the power transmission path 71, the one-way clutch 50 interposed in the power transmission path 71 between the output shaft 27 and the rotating shaft 3a for allowing relative rotation of the rotating shaft 3a with respect to the output shaft 27 in one direction and prohibiting relative rotation in opposite direction, and the controller 4 for controlling the speed change mechanism 70 (FIG. 1). The speed change mechanism 70 further includes the brake mechanism 30 having the mutually engageable and disengageable plates 31 and disks 32, and the clutch mechanism 40 having the mutually engageable and disengageable plates 41 and disks 42 (FIG. 1). The controller 4 controls the speed change mechanism 70 in response to shift instructions so as to disengage whichever of the brake mechanism 30 and clutch mechanism 40 is in engaged state and to engage whichever of the brake mechanism 30 and clutch mechanism 40 is in disengaged state (FIG. 12).

By providing the one-way clutch 50 between the speed change mechanism 70 and second motor-generator 3 in this manner, occurrence of negative acceleration caused by torque pull back when the brake mechanism 30 and clutch mechanism 40 are simultaneously engaged can be prevented. Therefore, the speed change mechanism 70 can switch promptly with good responsiveness, and smooth and efficient speed ratio shifting can be realized.

(2) During control of the speed change mechanism 70 in accordance with shift instruction, the controller 4 responds to start of rotation of the rotating shaft 3a relative to the output shaft 27 by controlling supply of electric power to the second motor-generator 3 so as to increase driving torque of the second motor-generator 3 (FIG. 12, t2 of FIG. 13A, and t2a of FIG. 13B). This enables realization of good running performance by minimizing decline of vehicle propelling force when mechanical torque from the engine 1 ceases to be transmitted to the axles 57 owing to the one-way clutch 50 assuming unlocked condition.

(3) The speed change mechanism 70 further includes the second planetary gear mechanism 20 having the second sun gear 21 connected to the output shaft 27, the second carrier 24, and the second ring gear 22 (FIG. 1). The brake mechanism 30 is configured to enable braking or non-braking of rotation of the second ring gear 22, and the clutch mechanism 40 is configured to enable integral joining or separation of the second sun gear 21 and second ring gear 22 (FIG. 2). Switching between high-speed range and low-speed range can therefore be achieved with a simple structure.

(4) The controller 4 responds to implementation of EV mode of traveling on power from the second motor-generator 3 with the engine 1 stopped by disengaging the brake mechanism 30 and disengaging the clutch mechanism 40, responds to implementation of HV mode of traveling on power from the engine 1 and power from the second motor-generator 3 by engaging either the brake mechanism 30 or the clutch mechanism 40 and disengaging the other thereof, and responds to implementation of series mode of traveling on power from the second motor-generator 3 while driving the first motor-generator 2 to generate electric power using motive power from the engine 1 by engaging the brake mechanism 30 and engaging the clutch mechanism 40. This enables typical drive modes of a hybrid vehicle, namely, EV mode, HV mode and series mode, to be readily achieved with a simple configuration solely for controlling engaging actions of the brake mechanism 30 and the clutch mechanism 40.

(5) HV mode includes HV low mode for powerful acceleration and HV high mode for normal driving. The controller 4 controls the speed change mechanism 70 so as to disengage the brake mechanism 30 and engage the clutch mechanism 40 when implementing HV low mode, so as to engage the brake mechanism 30 and disengage the clutch mechanism 40 when implementing HV high mode, and, upon being instructed to switch from HV low mode to HV high mode or from HV high mode to HV low mode in accordance with shift instruction, so as to shift from HV low mode to HV high mode via series mode or from HV high mode to HV low mode via series mode. Since action of the one-way clutch 50 is utilized to implement series mode in the course of shifting between HV low mode and HV high mode, low-high switching can be performed with good responsiveness while inhibiting overlapping engagement of the two frictional engagement mechanisms and/or torque pull back owing to control reaction force of the first motor-generator 2.

Various modifications of the aforesaid embodiment are possible. Some examples are explained in the following. In the aforesaid embodiment, the speed change mechanism 70 is configured as an automatic speed change mechanism adapted to automatically shift speed stage in accordance with vehicle speed and required driving force. In other words, shift instructions are output automatically by the controller 4, but manual output of shift instructions by driver operation of a switch, for example, is also alternatively possible. In the aforesaid embodiment (FIG. 1), the speed change mechanism 70 is configured by the second planetary gear mechanism 20, brake mechanism 30 and clutch mechanism 40, but a speed change mechanism is not limited to this configuration. The speed change mechanism need not have one each of a brake mechanism and a clutch mechanism, but can instead have a pair of brake mechanisms or a pair of clutch mechanisms. In the aforesaid embodiment (FIG. 1), the first planetary gear mechanism 10 serving as a power division mechanism is adapted to divide motive power generated by the engine 1 between the first motor-generator 2 and the second carrier 24 (a rotor). However, the rotor is not limited to this configuration.

In the aforesaid embodiment (FIG. 1), the brake mechanism 30 is configured to engage the plates 31 and disks 32 using pushing force of hydraulic pressure. However, the plates 31 and disks 32 can instead be engaged using spring biasing force and disengaged using hydraulic pressure. Similarly, as regards the clutch mechanism 40, the plates 41 and disks 42 can be engaged using spring biasing force and disengaged using hydraulic pressure. Although multi-plate wet type engagement elements are used in the brake mechanism 30 and clutch mechanism 40, band brake, dog or other type of engagement elements can be used instead. In other words, a first engagement mechanism and a second engagement mechanism are not limited to the aforesaid configurations.

In the aforesaid embodiment (FIG. 1), the power transmission path 71 for transmitting motive power output from the second sun gear 21 to the axles 57 is formed by the output shaft 27, output gear 51 etc., and the second motor-generator 3 is connected to the power transmission path 71 to transmit motive power of the second motor-generator 3 to the axles 57. However, a path forming portion is not limited to this configuration. Although in the aforesaid embodiment (FIG. 1), motive power from the speed change mechanism 70 is output from the output shaft 27 connected to the second sun gear 21, a second output shaft is not limited to this configuration. In the aforesaid embodiment (FIG. 1), the one-way clutch 50 is interposed between the output shaft 27 (second output shaft) and the rotating shaft 3a of the second motor-generator 3 (third output shaft). However, location of the one-way clutch is not limited to the aforesaid insofar as it is located between the second output shaft and the third output shaft.

In the aforesaid embodiment, the controller 4 is adapted to control actions of the brake mechanism 30 and clutch mechanism 40 so as to implement EV mode, W motor mode, series mode, HV low mode (first HV mode), HV high mode (second HV mode) and the like, but can also be adapted to implement other modes.

The present invention can also be used as a drive method of a hybrid vehicle including an internal combustion engine including a first output shaft, a first motor-generator, a rotor, a power division mechanism connected to the internal combustion engine to divide a power generated by the internal combustion engine to the first motor-generator and the rotor, a speed change mechanism including a second output shaft and configured to change a rotational speed of the rotor, a path forming portion configured to form a power transmission path transmitting a power from the second output shaft to an axle, a second motor-generator including a third output shaft connected to the power transmission path, and a one-way clutch interposed between the second output shaft and the third output shaft in the power transmission path to allow a relative rotation of the third output shaft with respect to the second output shaft in one direction and prohibit the relative rotation of the third output shaft in an opposite direction.

The above embodiment can be combined as desired with one or more of the above modifications. The modifications can also be combined with one another.

According to the present invention, it is possible to switch promptly a speed change mechanism installed in a drive system of a hybrid vehicle, and improve responsiveness of speed ratio shifting.

Above, while the present invention has been described with reference to the preferred embodiments thereof, it will be understood, by those skilled in the art, that various changes and modifications may be made thereto without departing from the scope of the appended claims.

What is claimed is:

1. A drive system of a hybrid vehicle, comprising:
an internal combustion engine including a first output shaft;
a first motor-generator;
a rotor;
a power division mechanism connected to the internal combustion engine to divide a power generated by the internal combustion engine to the first motor-generator and the rotor;
a speed change mechanism including a second output shaft and configured to change a rotational speed of the rotor;
a path forming portion configured to form a power transmission path transmitting a power from the second output shaft to an axle;
a second motor-generator including a third output shaft connected to the power transmission path;
a one-way clutch interposed between the second output shaft and the third output shaft in the power transmission path to allow a relative rotation of the third output shaft with respect to the second output shaft in one direction and prohibit the relative rotation of the third output shaft in an opposite direction; and
an electric control unit including a microprocessor and a memory and configured to control the speed change mechanism, wherein
the speed change mechanism includes a first engagement mechanism including mutually engageable and disengageable members and a second engagement mechanism including mutually engageable and disengageable members, and
the microprocessor is configured to control the speed change mechanism so as to disengage one of the first engagement mechanism and the second engagement mechanism in an engaged state and engage the other of the first engagement mechanism and the second engagement mechanism in a disengaged state, in accordance with a speed change instruction.

2. The drive system according to claim 1, wherein
the microprocessor is configured to further control the second motor-generator so as to increase a driving torque of the second motor-generator when the relative rotation of the third output shaft with respect to the second output shaft starts during controlling the speed change mechanism in accordance with the speed change instruction.

3. The drive system according to claim 2, wherein
the microprocessor is configured to control a supply of an electric power to the first motor-generator so as to increase a power generation amount by the first motor-generator when the relative rotation of the third output shaft with respect to the second output shaft starts during controlling the speed change mechanism in accordance with the speed change instruction.

4. The drive system according to claim 3, further comprising a battery, wherein
the microprocessor is configured to control the second motor-generator so as to drive the second motor-generator by an electric power supplied from the battery when the relative rotation of the third output shaft with respect to the second output shaft starts during controlling the speed change mechanism in accordance with the speed change instruction.

5. The drive system according to claim 1, wherein
the speed change mechanism further includes a planetary gear mechanism having a sun gear connected to the second output shaft, a ring gear, and a carrier constituting the rotor,
one of the first engagement mechanism and the second engagement mechanism is a brake mechanism configured to brake or non-brake the ring gear, and
the other of the first engagement mechanism and the second engagement mechanism is a clutch mechanism configured to integrally join or separate the sun gear and the ring gear.

6. The drive system according to claim 1, wherein
the microprocessor is configured to change a drive mode to an EV mode in which the vehicle is driven by a power of the second motor-generator and the internal combustion engine is stopped, a HV mode in which the vehicle is driven by the power of the second motor-generator and a power of the internal combustion engine, or a series mode in which the vehicle is driven by the power of the second motor-generator and the first motor-generator is generated by the power of the internal combustion engine, and
the microprocessor is configured to control the speed change mechanism so as to disengage the first engagement mechanism and disengage the second engagement mechanism when switching the drive mode to the EV mode, engage one of the first engagement mechanism and the second engagement mechanism and disengage the other of the first engagement mechanism and the second engagement mechanism when switching the drive mode to the HV mode, and engage the first engagement mechanism and engage the second engagement mechanism when switching the drive mode to the series mode.

7. The drive system according to claim 6, wherein
the HV mode includes a first HV mode corresponding to a first speed stage and a second HV mode corresponding to a second speed stage of high speed side than the first speed stage, and
the microprocessor is configured to control the speed change mechanism so as to disengage the first engagement mechanism and engage the second engagement mechanism when switching the drive mode to the first HV mode, and engage the first engagement mechanism and disengage the second engagement mechanism when switching the drive mode to the second HV mode, and
the microprocessor is configured to control the speed change mechanism so as to change from the first HV mode to the second HV mode via the series mode when switching the drive mode from the first HV mode to the second HV mode, and change from the second HV mode to the first HV mode via the series mode when switching the drive mode from the second HV mode to the first HV mode.

8. A drive method of a hybrid vehicle, the hybrid vehicle including: an internal combustion engine including a first output shaft; a first motor-generator; a rotor; a power division mechanism connected to the internal combustion engine to divide a power generated by the internal combustion engine to the first motor-generator and the rotor; a speed change mechanism including a second output shaft and configured to change a rotational speed of the rotor; a path forming portion configured to form a power transmission path transmitting a power from the second output shaft to an axle; a second motor-generator including a third output shaft connected to the power transmission path; and a one-way clutch interposed between the second output shaft and the third output shaft in the power transmission path to allow a relative rotation of the third output shaft with respect to the second output shaft in one direction and prohibit the relative rotation of the third output shaft in an opposite direction, the speed change mechanism including a first engagement mechanism having mutually engageable and disengageable members and a second engagement mechanism having mutually engageable and disengageable members,
the drive method comprising
controlling the speed change mechanism so as to disengage one of the first engagement mechanism and the second engagement mechanism in an engaged state and engage the other of the first engagement mechanism and the second engagement mechanism in a disengaged state, in accordance with a speed change instruction.

\* \* \* \* \*